Jan. 12, 1932.  M. L. MATHEWS ET AL  1,840,731
GUIDE FOR CIRCULAR SAWS
Filed Dec. 19, 1930

Inventors
M. L. Mathews and
F. C. Brice.
By E. W. Bond
Attorney

Patented Jan. 12, 1932

1,840,731

UNITED STATES PATENT OFFICE

MARCUS L. MATHEWS AND FRANK C. BRICE, OF HOLOPAW, FLORIDA

GUIDE FOR CIRCULAR SAWS

Application filed December 19, 1930. Serial No. 503,558.

This invention relates to a saw guide and more particularly to a guide adapted to be suspended from the frame over a circular saw and serve to guide the saw blade when it is rotating.

One object of the invention is to provide a guide which is so associated with the upper portion of the saw blade that vibration of the blade will be prevented, thereby permitting thinner saws to be used and also causing lumber to be more accurately cut.

Another object of the invention is to provide the guide with saw blade engaging arms so mounted that they may be swung upward15 ly from an operative position to an inoperative position where they will be out of the way if a large log is being cut.

Another object of the invention is to provide improved means for moving the arms into and out of an operative position and so construct this means that blade engaging pins will be moved out of engagement with the blade while the arms are being moved from one position to another.

Another object of the invention is to provide a saw guide which is simple in construction and easy to operate.

Other objects and advantages of the invention will hereinafter appear, and the novel features thereof will be particularly pointed out in the appended claims.

The invention is illustrated in the accompanying drawings wherein:—

Figure 1:
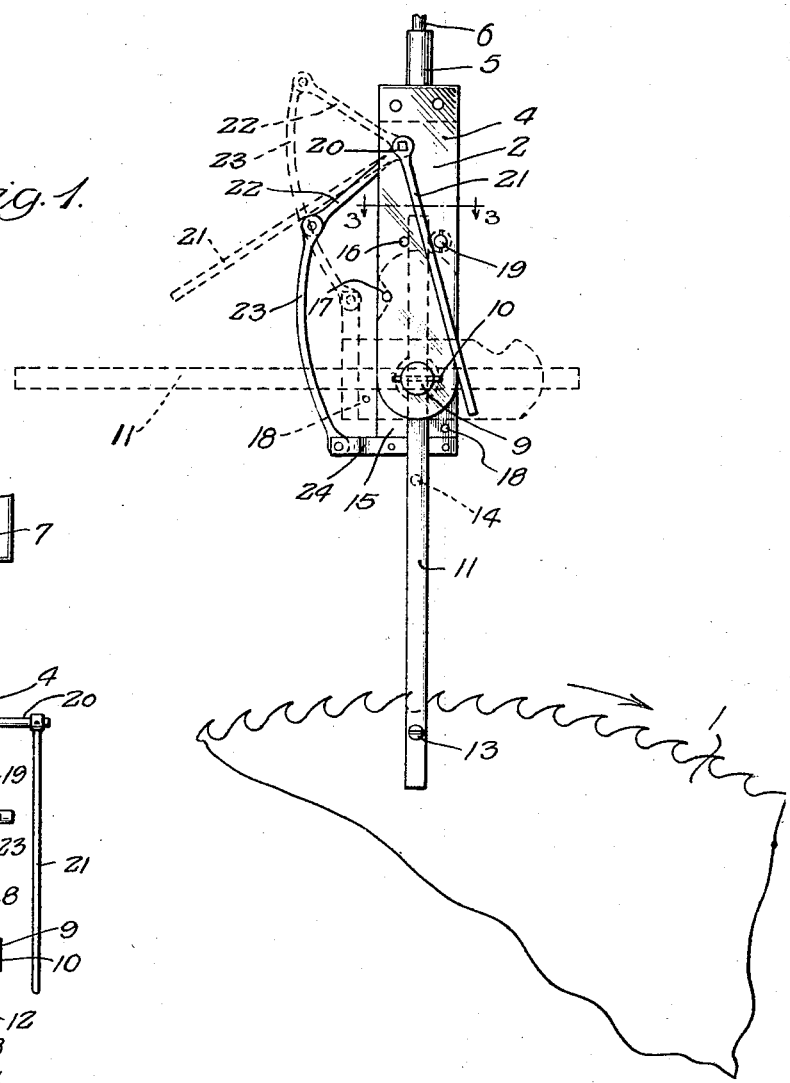
Fig. 1 is a side elevation showing the saw guide in operative relation to a saw blade, dotted lines indicating the inoperative position of the guides.
Figure 2:
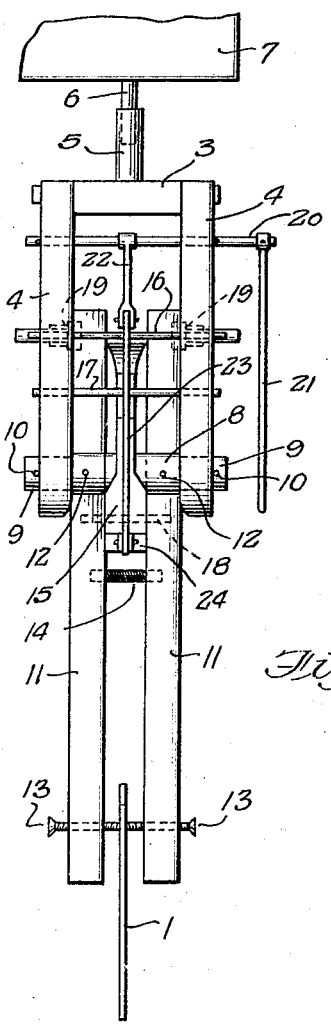
Fig. 2 is a front elevation of the improved saw guide.
Figure 3:
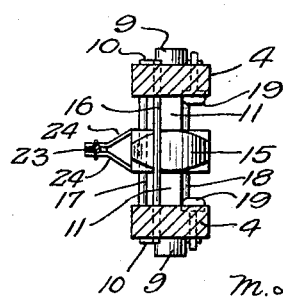

Fig. 3 is a sectional view taken along the line 3—3 of Fig. 1.

This improved guide is for use in connection with a rotary saw blade 1 and is to be mounted over the upper portion of the blade and permits use of a saw blade made of thinner gauge steel than is now possible, as it will very effectively prevent the blade from vibrating transversely when in use. At the present time, guides for the lower portions of saw blades are used but they do not successfully prevent vibrations if the blades are formed of thin gauge steel.

The frame 2 of this guide has a cross head 3 to which the upper ends of side bars 4 are bolted or otherwise firmly secured and from the cross head rises a column 5 engaged with a threaded rod or stem 6 which is suitably connected with a portion 7 of a saw frame above the blade so that by turning the rod the guide may be raised or lowered and thus adjusted to accommodate the guide to the size of the saw blade.

A shaft 8 has reduced ends rotatably engaged through openings formed in the lower ends of the side bars 4 and held in these openings by pins 10. Between the side bars the shaft is formed with a longitudinally extending slot through end portions of which extend arms 11 which are pivotally mounted for swinging movement longitudinally of the shaft by pins 12. Therefore, the arms may have their lower ends moved into and out of engagement with opposed side faces of the blade. A spring 14 mounted between the arms below the shaft urges their lower ends apart.

Between the arms 11 is located a cam block 15 which fits loosely about the shaft 8 for swinging movement between the arms. This block is tapered in cross section as shown in Fig. 3 and when its upper portion is forced forwardly between the arms this causes the arms to be swung about the pins 12 and their lower ends moved towards each other until the screws 13 contact with side faces of the saw blade.

By adjusting the screws proper contact thereof with the saw blade may be obtained. Rods 16 and 17 carried by the side bars 4 limit forward moving of the upper portions of the arms 11 and cam block and the lower portion of the cam block carries a pin 18 which projects from opposite sides thereof and is intended to engage the rear faces of the arms and swing the arms upwardly to the inoperative position indicated by dotted lines in Fig. 1. Spring-pressed latches 19 yieldably retain the arms in the vertical position by engaging rear faces of their upper portions.

In order to actuate the cam block and swing the arms vertically, there has been provided a shaft 20 which is rotatably engaged through openings in the upper portions of the side bars 4 and carries a depending handle 21 at one end. An arm 22 which is fixed to the shaft 20 projects forwardly therefrom and is pivoted to the upper end of a pitman 23 which has its lower end pivotally connected to straps 24 secured against side faces of the lower end of the cam block 15. By moving the handle 21 forwardly, the shaft 20 is rotated to swing the arm 22 upwardly and this exerts pull upon the pitman or link 23 to swing the cam block about the shaft 8. As the cam block swings about the shaft 8 its upper end moves rearwardly from between the arms 11 thereby allowing the spring 14 to move the lower ends of the arms apart and move the screws away from the saw blade. At the same time, the lower end of the block 14 swings upwardly and the end portions of the rod or pin 18 by engaging rear faces of the arms cause the arms to be swung upwardly to the raised position indicated by dotted lines in Fig. 1 where they will be out of the way and not be struck by a log of such size that it could not pass the arms when in the position shown by full lines in this figure. When the handle is moved in an opposite direction the cam block and arms return to the vertical position and continued pressure upon the handle causes the upper portion of the cam block to move forwardly between the arms and swing the arms about the pins 12 to move the screws 13 into engagement with the saw blade.

The latches 19 retain the arms in the vertical position but since they are spring-pressed the arms may be forced past them in case the lower ends of the arms should be struck by a log being cut. Therefore, danger of damaging the guide is eliminated. Since the abutment screws which bear against opposite side faces of the saw blade to prevent vibration are moved away from the blade before the arms are swung upwardly towards the horizontal inoperative position there is no danger of them catching against teeth of the saw and damaging the teeth.

What we claim is:—

1. A guide for a circular saw blade comprising a frame having a cross head and depending side bars, a shaft rotatably carried by said bars, arms carried by said shaft for swinging movement when the shaft rotates from a raised substantially horizontal inoperative position to a vertical operative position in which their lower end portions overlap a saw blade at opposite sides thereof, the arms being pivoted to the shaft for swinging movement longitudinally thereof whereby they may have their lower ends moved into and out of contact with side faces of the blade, and means to swing said arms into and out of the operative position and move their lower ends into contact with the blade after being moved to their operative position.

2. A guide for a circular saw blade comprising a frame having a cross head and depending side bars, a shaft rotatably carried by said bars, arms carried by said shaft for swinging movement when the shaft rotates from a raised substantially horizontal inoperative position to a vertical operative position in which their lower end portions overlap a saw blade at opposite sides thereof, the arms being pivoted to the shaft for swinging movement longitudinally thereof whereby they may have their lower ends moved into and out of contact with the side faces of the blade, resilient means to yieldably hold the arms out of position to contact with side faces of the blade, and means to swing said arms into and out of the operative position and move their lower ends into contact with the blade after being moved to their operative position.

3. A guide for a circular saw blade comprising a frame having a cross head and depending side bars, a shaft rotatably carried by said bars, arms carried by said shaft for swinging movement when the shaft rotates from a raised substantially horizontal inoperative position to a vertical operative position in which their lower end portions overlap a saw blade at opposite sides thereof, the arms being pivoted to the shaft for swinging movement longitudinally thereof whereby they may have their lower ends moved into and out of contact with the side faces of the blade, resilient means to yieldably hold the arms out of position to contact with side faces of the blade, a block loose upon said shaft between said arms having its upper portion constituting a cam to engage between upper portions of the arms and move the arms to dispose their lower ends in engagement with the side faces of the saw blade, and means to swing said block about the shaft, and move the arms into and out of an operative position.

4. A guide for a circular saw blade comprising a frame having a cross head and depending side bars, a shaft rotatably carried by said bars, arms carried by said shaft for swinging movement when the shaft rotates from a raised substantially horizontal inoperative position to a vertical operative position in which their lower end portions overlap a saw blade at opposite sides thereof, the arms being pivoted to the shaft for swinging movement longitudinally thereof whereby they may have their lower ends moved into and out of contact with the side faces of the blade, resilient means to yieldably hold the arms out of position to contact with the side faces of the blade, a block loose upon said shaft between said arms having its upper portion constituting a cam to engage between the upper portions of the arms and move the arms to dispose their lower ends in engagement with the side faces of the saw blade, a pin carried by the lower portion of said block and projecting from opposite sides thereof to engage the arms and swing the arms to the inoperative position when the lower portion of the block is swung upwardly, means for imparting swinging movement to the upper portion of the block inwardly between the upper portions of said arms.

5. A guide for a circular saw blade comprising a frame having a cross head and depending side bars, a shaft rotatably carried by said bars, arms carried by said shaft for swinging movement when the shaft rotates from a raised substantially horizontal inoperative position to a vertical operative position in which their lower end portions overlap a saw blade at opposite sides thereof, the arms being pivoted to the shaft for swinging movement longitudinally thereof whereby they may have their lower ends moved into and out of contact with the side faces of the blade, resilient means to yieldably hold the arms out of position to contact with the side faces of the blade, a block loose upon said shaft between the said arms having its upper portion constituting a cam to engage between the upper portions of the arms and move the arms to dispose their lower ends in engagement with the side faces of the saw blade, a pin carried by the lower portion of said block and projecting from opposite sides thereof to engage the arms and swing the arms to the inoperative position when the lower portion of the block is swung upwardly, a rocker shaft rotatably supported by said frame above said arms, a handle for said shaft, an arm projecting from said shaft, a link pivoted to said arms and having its lower end connected with the lower portion of said block to impart movement to the block when the rock shaft is rotated, and a rod carried by the side bars of said frame to engage the block and limit the movement of the upper portion of the block inwardly between the upper portions of said arms.

In testimony whereof we affix our signatures.

MARCUS L. MATHEWS.
FRANK C. BRICE.